W. H. PRATT.
ELECTRIC METER.
APPLICATION FILED MAR. 13, 1911.
1,062,031.
Patented May 20, 1913.
2 SHEETS—SHEET 1.
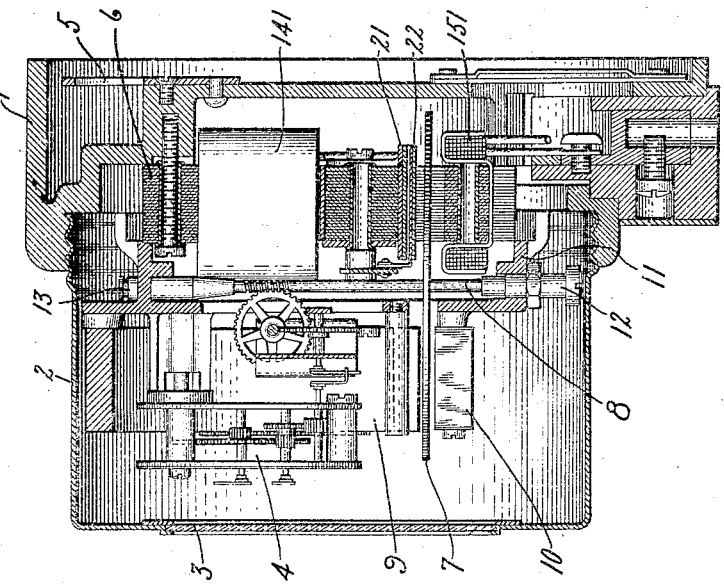
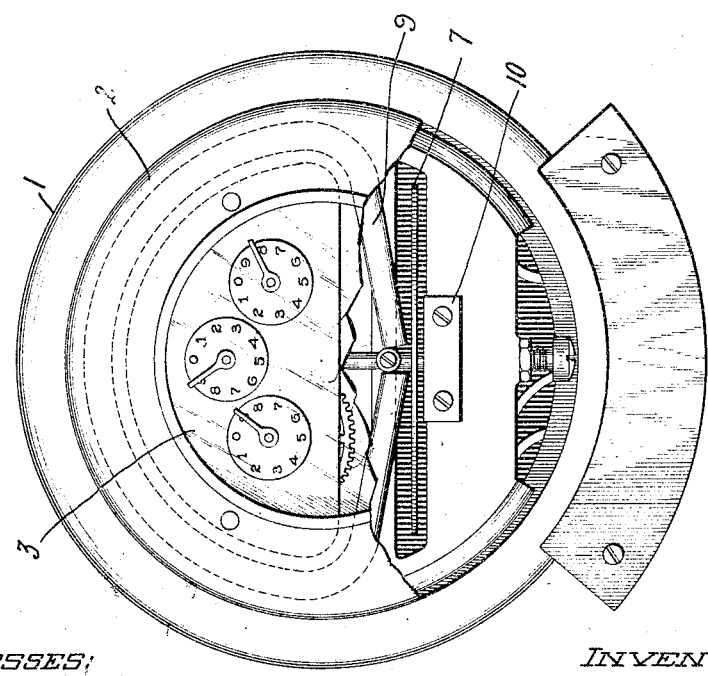
WITNESSES:
George W. Tilden
J. Ellis Glen.
INVENTOR
WILLIAM H. PRATT,
BY
HIS ATTORNEY.

W. H. PRATT.
ELECTRIC METER.
APPLICATION FILED MAR. 13, 1911.

1,062,031.

Patented May 20, 1913
2 SHEETS—SHEET 2.

WITNESSES:
George W. Tilden
J. Ellis Ela

INVENTOR
WILLIAM H. PRATT,
BY
HIS ATTORNEY.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRIC METER.

1,062,034.

Specification of Letters Patent. Patented May 20, 1913.

Application filed March 13, 1911. Serial No. 614,057.

*To all whom it may concern:*

Be it known that I, WILLIAM H. PRATT, a citizen of the United States, residing at Lynn, county of Essex, State of Massachusetts, have invented certain new and useful Improvements in Electric Meters, of which the following is a specification.

My improvement relates to electric meters and has for its object an improvement in such devices.

More specifically my invention relates to improvements in the construction of such meters so that a reliable meter may be built in a simple and cheap manner, and I accomplish the object of my invention by the use of an improved form of magnetic circuit, of flux shifting devices, and of the arrangement of the meter structure.

The novel features of my invention I have pointed out with particularity in the claims which are appended to and made a part of this specification.

For a further understanding of my invention, reference may be had to the accompanying drawings, where—

Figure 4:
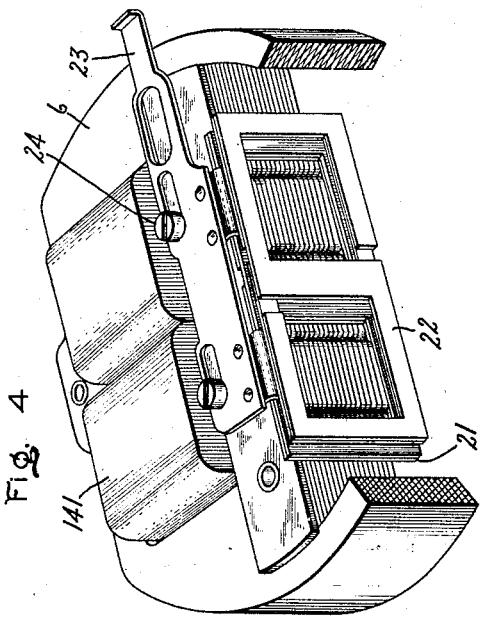
Figure 6:
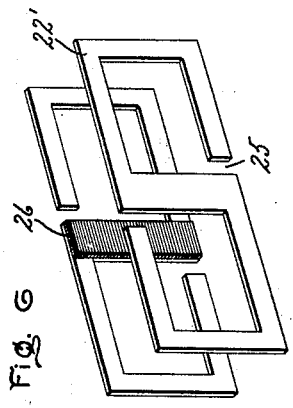
Figure 3:
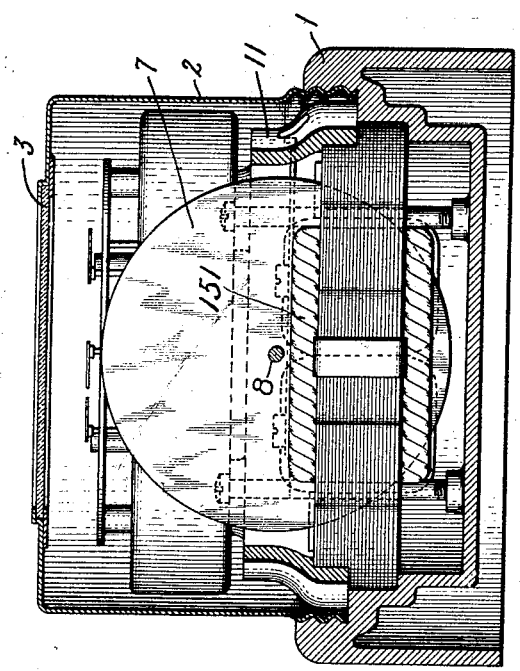
Figure 5:
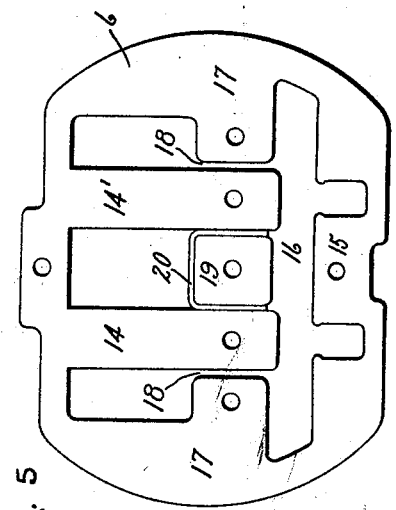

Figure 1 shows a front elevation of my meter with a portion of the cover broken away; Fig. 2 is a vertical section of the meter; Fig. 3 is a horizontal section of the same looking upward; Fig. 4 is a perspective view on a larger scale showing a portion of the magnetic circuit, the potential coils and the lagging and friction compensating devices; Fig. 5 is a view of the punchings which form the magnetic circuit; and Fig. 6 is a perspective view showing the construction of the lagging and friction compensating devices.

Referring first to Fig. 2, the meter consists of a base 1, to which is attached a cover 2, inclosing the operating portions of the meter, by which I mean the armature, magnetic circuit, with its energizing coils, damping magnet and registering mechanism. Fastened to the front of the cover is a glass plate 3 for observing the readings of the registering mechanism 4. Attached to the base is a lug 5 for suitably supporting the meter. The magnetic circuit 6, which is formed of a plurality of punchings, is attached to base 1. In operative relation with this circuit is a disk armature 7 fastened to shaft 8. Damping magnet 9 is placed so that its poles are in close proximity to the armature and to magnetic member 10, which is also placed close to the armature on the opposite side thereof to increase the damping effect of the magnet. Member 11, outside of the magnetic circuit with its energizing coils, is fastened to the base 1, and to this member are attached the damping magnet 9, the registering mechanism 4 and bearings 12 and 13 which support the meter shaft. By this construction these portions of the meter may be readily removed and replaced without disturbing the remainder thereof.

Referring now to Fig. 5, it will be seen that the magnetic circuit consists of two adjacent main polar projections 14, 14' and a main polar projection 15 facing these two projections and separated therefrom by an air gap 16, through which extends the meter armature, see Fig. 2. Surrounding and energizing polar projections 14, 14' is the potential winding consisting of two potential coils 141, connected so that these projections are of different polarities. Forming shunt magnetic paths about the armature for the potential fluxes and exterior to these projections are members or projections 17, which extend, as shown, in close proximity to polar projections 14, 14', small air gaps 18 separating these members from the polar projections. In addition to the shunt paths furnished by these members is the shunt path for the potential flux between members 14, 14' formed by magnetic member 19, which is placed, as shown, between these polar projections and separated therefrom by non-magnetic member 20. These shunt paths are provided for lagging the potential flux in the well known manner. Surrounding and energizing polar projection 15 is the series coil 151, see Figs. 2 and 3. The entire series flux will pass through the air gap and the armature through which it extends to the two potential polar projections and the magnetic members adjacent thereto, but only a portion of the potential flux will pass through this gap and the armature, the greater portion being shunted by the shunt paths previously described for lagging the potential flux. I prefer to make the magnetic circuit of a plurality of single punchings of the shape shown, but, if it may be desired, such punchings may be made of several parts which may be combined together to form a circuit such as I have described.

Referring now to Figs. 2 and 4, between the potential and series poles and adjacent to the armature are the flux shifting devices, that is the lagging plate 21 for lagging the potential flux in the usual manner, and the friction compensating device 22. This device is attached in any suitable manner to arm 23 and is arranged so that it will move in a plane substantially parallel to that of the armature to compensate for friction in the usual manner. This device is held in the correct position for compensation by means of screws 24.

Referring now to Fig. 6, which shows the construction which I employ for the lagging and friction compensating devices, it will be seen that these devices consist of two S-shaped conducting members 22' having gaps 25. These members are superposed in a reversed position, as will be seen by referring to Fig. 4, Fig. 6 showing them as separated for a better understanding of their construction. Between the central portions of these members is a thin insulating strip 26, and these members, with the strip between them, are fastened together so that they are conductively connected as to their end portions but are insulated from each other as to their central portions by means of this strip as may be seen by referring to the drawings. As will be seen by referring to Fig. 4, these flux shifting devices inclose the flux between the series and potential coils that passes through the armature, and I employ this particular form of construction so that these members will form a circuit in inductive relation to the potential poles and in non-inductive relation to the series pole. It will be seen, by referring to Fig. 6, that this is the case, since the flux from the potential poles will induce currents in these members that will flow around the end portion of one of these members until the gaps 25 are reached, when the current will pass into the other member, whereas currents induced by the flux from the series pole will not flow in this member since there is no completely closed circuit about which they may pass. By this arrangement I obtain a better lagging effect than if two completely closed circuits were employed.

While I have described a preferred embodiment of my invention, I do not limit myself to such embodiment, but seek in the appended claims to cover all embodiments which shall not depart from the scope of my invention and shall be obvious to those skilled in the art.

What I claim as new and desire to secure by Letters Patent of the United States, is,—

1. In an electric meter, a disk armature, potential coils in operative relation therewith, and a magnetic circuit therefor having two adjacent main polar projections for said coils, members separated therefrom by air gaps adjacent to the main projections, and a magnetic member between the main projections, the said members forming shunt paths for the potential fluxes about the armature.

2. An electric meter comprising in combination, a disk armature, potential coils and a series coil in operative relation therewith, and a magnetic circuit therefor comprising a plurality of punchings having two adjacent main polar projections for the potential coils, a polar projection for the series coil facing the potential poles separated therefrom by a gap through which extends the armature and members furnishing shunt paths for the potential fluxes about the armature.

3. An electric meter comprising in combination, a disk armature, potential coils and a series coil in operative relation therewith, and a magnetic circuit comprising a plurality of punchings having two adjacent main polar projections for the potential coils, a polar projection for the series coil facing the potential poles extending part way across the faces of both poles and separated therefrom by a gap through which extends the armature and members furnishing shunt paths for the potential fluxes about the armature.

4. An electric meter comprising in combination, a disk armature, potential coils and a series coil in operative relation therewith, and a magnetic circuit comprising a plurality of single punchings having two adjacent main polar projections for the potential coils, a polar projection for the series coil facing the potential poles extending part way across the faces of both poles and separated therefrom by a gap through which extends the armature, and members furnishing a shunt path for the potential fluxes about the armature.

5. An electric meter comprising in combination, a disk armature, in operative relation therewith a potential winding, a magnetic circuit therefor comprising a plurality of punchings having two adjacent main polar projections for said winding, projections adjacent thereto separated therefrom by air gaps forming shunt paths for the potential fluxes about the armature, a polar projection facing the main projections separated therefrom by an air gap through which extends the armature, a series coil energizing said projection, and a magnetic member between the main projections also forming a shunt path for the potential fluxes about the armature.

6. An electric meter comprising in combination, a disk armature, in operative relation therewith a potential winding, a magnetic circuit therefor comprising a plurality of single punchings having two adjacent main polar projections for said winding, projections adjacent thereto separated therefrom by air gaps forming shunt paths for the potential fluxes about the armature, a polar projection facing the main projections separated therefrom by an air gap through which extends the armature, a series coil energizing said projection, and a magnetic member between the main projections also forming a shunt path for the potential fluxes about the armature.

7. In an electric meter, a flux shifting device comprising two S-shaped conducting members superposed in a reversed position conductively connected as to their end portions and insulated from each other as to their central portions.

8. In an electric meter, potential coils, poles energized thereby, a series coil, a pole energized thereby facing the potential poles, and a flux shifting device between the potential and series poles comprising conducting members forming a circuit in inductive relation to the potential poles and in non-inductive relation to the series pole inclosing the flux between the series and potential poles.

9. In an electric meter, a potential winding, poles energized thereby, a series coil, a pole energized thereby facing the potential poles, lagging and friction compensating devices between said poles forming circuits in inductive relation to the potential poles and in non-inductive relation to the series pole.

10. In an electric meter, potential coils, poles energized thereby, a series coil, a pole energized thereby facing the potential poles, lagging and friction compensating devices between said poles forming circuits in inductive relation to the potential poles and in non-inductive relation to the series pole, and means for moving the friction compensating device in a plane substantially parallel to that of the armature.

11. In an electric meter, potential coils, poles energized thereby, a series coil, a pole energized thereby facing the potential poles, and a flux shifting device between the potential and series poles comprising two S-shaped conducting members superposed in a reversed position conductively connected as to their end portions and insulated from each other as to their central portions inclosing the flux between the series and potential poles.

12. An electric meter comprising in combination, a disk armature, potential coils and a series coil in operative relation therewith, a magnetic circuit therefor comprising a plurality of punchings having two adjacent polar projections for the potential coils, a polar projection for the series coil facing the potential poles and separated therefrom by a gap through which extends the armature, members furnishing a shunt path for the potential fluxes about the armature, and a flux shifting device between the potential and series poles comprising conducting members forming a circuit in inductive relation to the potential poles and in non-inductive relation to the series pole.

13. An electric meter comprising in combination, a disk armature, potential coils and a series coil in operative relation therewith, a magnetic circuit comprising a plurality of punchings having two adjacent polar projections for the potential coils, a polar projection for the series coil facing the potential poles extending part way across the faces of both poles separated therefrom by a gap through which extends the armature and members furnishing a shunt path for the potential fluxes about the armature, and a flux shifting device between the potential and series poles comprising two S-shaped conducting members superposed in a reversed position conductively connected as to their end portions and insulated from each other as to their central portions inclosing the flux between the series and potential poles.

14. An electric meter comprising in combination, a base, attached thereto a magnetic circuit comprising a plurality of punchings having two adjacent main polar projections, a polar projection facing thereto and separated therefrom by an air gap and members furnishing a magnetic path about said gap, potential coils surrounding the two adjacent polar projections, a series coil surrounding the single polar projection, a shaft, a disk armature attached thereto extending through said gap, a lagging device in said gap comprising two S-shaped conducting members superposed in a reversed position conductively connected as to their end portions and insulated from each other as to their central portions inclosing the flux between the series and the potential polar projections, a friction compensating device of similar construction to said plate movable in a plane substantially parallel to that of the armature, a member fastened to the base, bearings for the shaft attached to said member, a damping magnet in operative relation with the armature attached to said member, an indicating device in operative relation to the armature attached to said member, and a cover attached to the base inclosing the operating portions of the meter.

In witness whereof, I have hereunto set my hand this tenth day of March, 1911.

WILLIAM H. PRATT.

Witnesses:
JOHN A. MCMANUS, Jr.,
CHARLES A. BARNARD.